(12) United States Patent
Adelmann

(10) Patent No.: US 7,120,777 B2
(45) Date of Patent: *Oct. 10, 2006

(54) DEVICE IDENTIFICATION USING A MEMORY PROFILE

(76) Inventor: Todd C. Adelmann, 5875 N. Brooklet Pl., Boise, ID (US) 83713

( * ) Notice: Subject to any disclaimer, the term of this patent is extended or adjusted under 35 U.S.C. 154(b) by 0 days.

This patent is subject to a terminal disclaimer.

(21) Appl. No.: 11/061,207

(22) Filed: Feb. 18, 2005

(65) Prior Publication Data

US 2005/0149687 A1 Jul. 7, 2005

Related U.S. Application Data

(63) Continuation of application No. 10/366,770, filed on Feb. 14, 2003, now Pat. No. 6,889,305.

(51) Int. Cl.
*G06F 12/00* (2006.01)

(52) U.S. Cl. .................................................. 711/170
(58) Field of Classification Search ................ 711/170, 711/202; 712/1; 713/1, 100
See application file for complete search history.

(56) References Cited

U.S. PATENT DOCUMENTS 6,889,305 B1 * 5/2005 Adelmann .................. 711/170

* cited by examiner

*Primary Examiner*—Hiep T. Nguyen

(57) ABSTRACT

In accordance with an embodiment of the present invention, a method for identification of a semiconductor device having a plurality of memory blocks, comprises accessing a memory profile for the semiconductor device based at least in part on an identification of defective memory blocks of the semiconductor device and determining a unique identifier for the semiconductor device based at least in part on the memory profile of the semiconductor device.

9 Claims, 2 Drawing Sheets

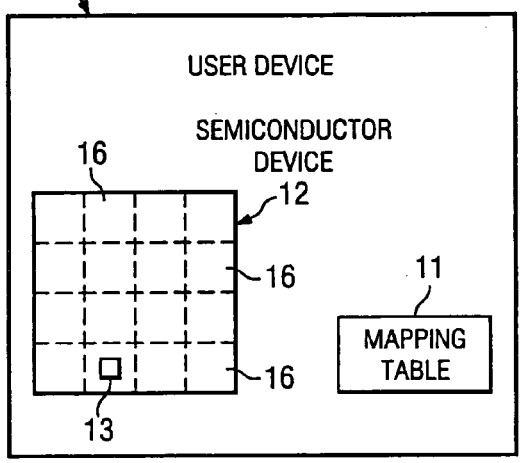
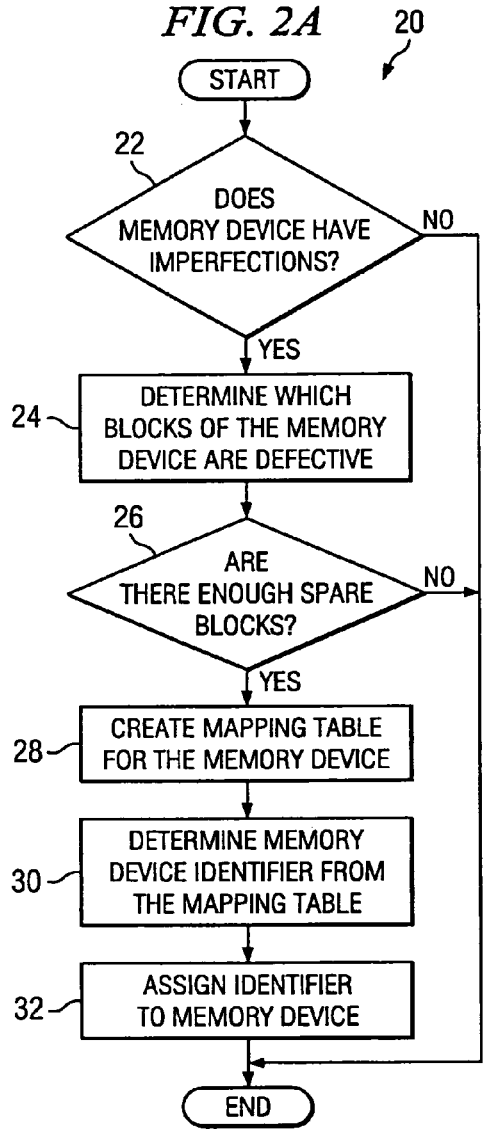
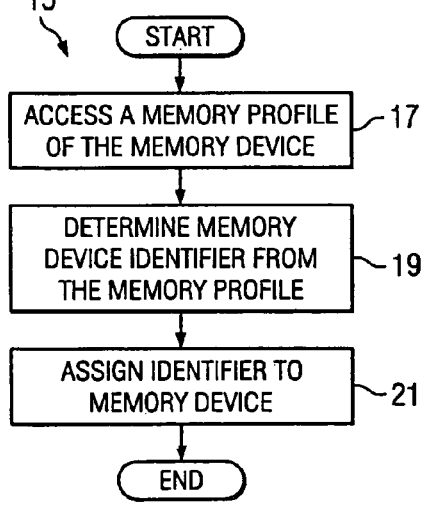

DEVICE IDENTIFICATION USING A MEMORY PROFILE

RELATED APPLICATIONS

This application is a continuation of U.S. patent application Ser. No. 10/366,770, filed Feb. 14, 2003 now U.S. Pat. No. 6,889,305, entitled "DEVICE IDENTIFICATION USING A MEMORY PROFILE."

TECHNICAL FIELD OF THE INVENTION

The present invention relates generally to the field of semiconductor devices, and more particularly to identification of a storage device using its memory profile.

BACKGROUND OF THE INVENTION

Semiconductor devices, such as integrated circuits, are manufactured in batches with an intent to make the chips identical. Batch manufacturing of the chips is useful in lowering manufacturing costs. However, it is desirable to be able to distinguish an individual integrated circuit from others, for example to track its source of manufacture, or to identify a system employing the integrated circuit. Individually identifiable integrated circuits may be used to validate transactions, route messages, track items, recover stolen goods, etc. Further, many such devices which conform to certain security protocols are required to have unique identifiers. The devices may have unique encryption keys to make it difficult to hack into the devices.

SUMMARY OF THE INVENTION

In accordance with an embodiment of the present invention, a method for identification of a semiconductor device having a plurality of memory blocks, comprises accessing a memory profile for the semiconductor device based at least in part on an identification of defective memory blocks of the semiconductor device and determining a unique identifier for the semiconductor device based at least in part on the memory profile of the semiconductor device.

In accordance with another embodiment of the present invention, a user device comprises a memory device having a plurality of memory blocks for storing data and a unique memory device identifier assigned to the memory device, the memory device identifier determined based at least in part on a memory profile of the memory device, the memory profile based at least in part on an identification of defective memory blocks in the memory device.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a block diagram of a user device incorporating a semiconductor device in which embodiments of the invention may be used to advantage;

FIG. 2A is a flowchart of an exemplary method for uniquely identifying a semiconductor device in accordance with an embodiment of the present invention;

FIG. 2B is a flowchart of an exemplary method for uniquely identifying a semiconductor device in accordance with another embodiment of the present invention.

DETAILED DESCRIPTION OF THE DRAWINGS

Figure 3:
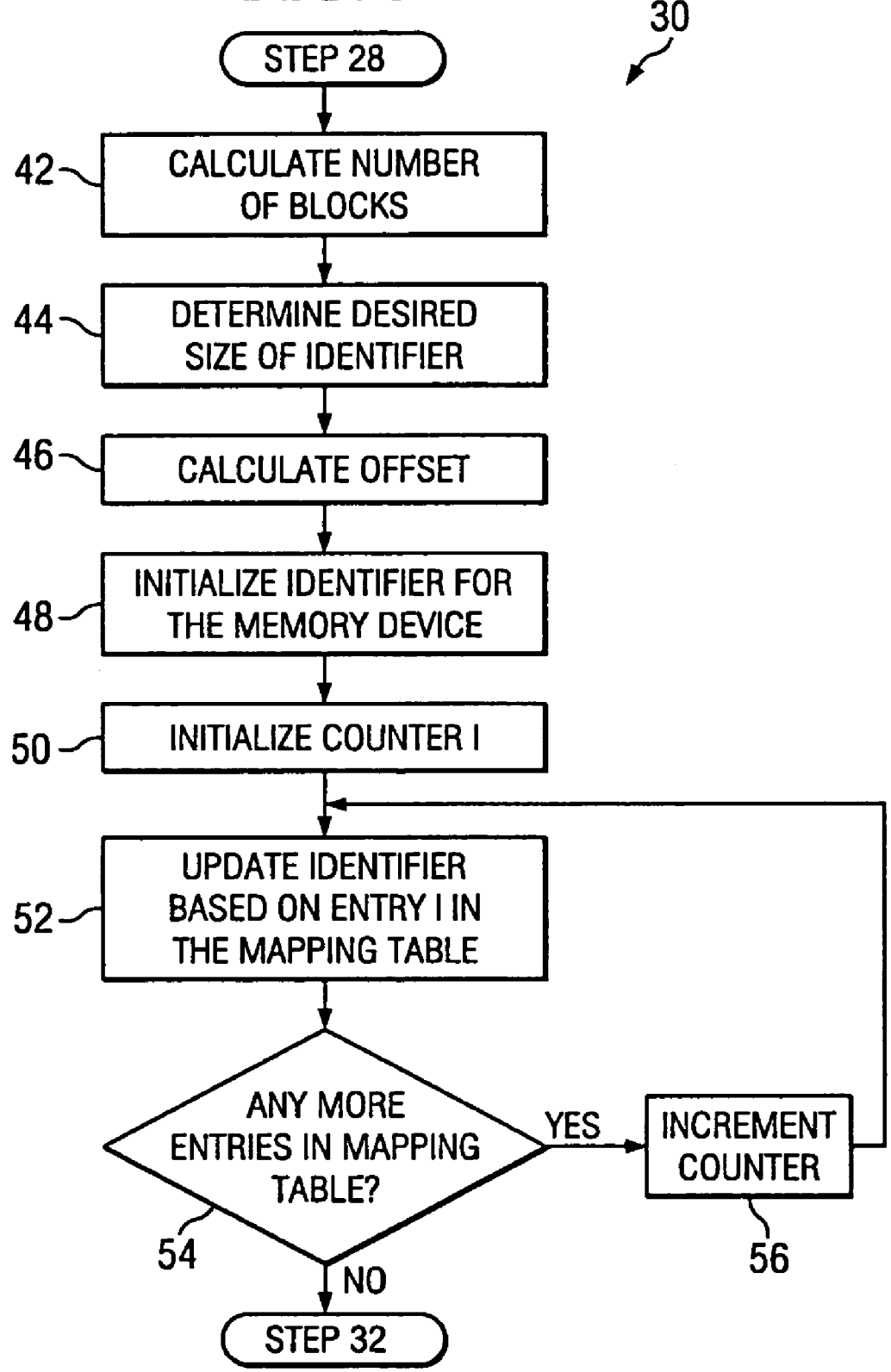
FIG. 3 is a flowchart of an exemplary method for determining an identifier for a semiconductor device in accordance with an embodiment of the present invention.

The preferred embodiment of the present invention and its advantages are best understood by referring to FIGS. 1 through 3 of the drawings, like numerals being used for like and corresponding parts of the various drawings.

There is a desire for uniquely identifying a semiconductor device, e.g. a memory device. In accordance with one embodiment of the present invention, a method for uniquely identifying the semiconductor device based on its memory profile uses information contained in a mapping table to determine an identifier which may be used to uniquely identify the semiconductor device. A mapping table is typically created to map a plurality of continuous logical addresses to physical addresses of the memory blocks which comprise the semiconductor device. By mapping the logical addresses around defective memory blocks, a mapping table that is unique to the semiconductor device for which it is created may be obtained.

FIG. 1 is a block diagram of a user device 10 incorporating a semiconductor device 12 in which embodiments of the invention may be used to advantage. User device 10 may be a personal computer, a cell phone, a personal digital assistant, a camera, a scanner, a smart card, a smart implant, a smart badge, a home appliance, a memory card and/or the like. Semiconductor device 12 may be a memory device capable of storing data, for example a Random Access Memory (RAM), a Dynamic Random Access Memory (DRAM), a Static Random Access Memory (SRAM), a Pseudo Static Random Access Memory (PSRAM), a Magnetic Random Access Memory (MRAM), and/or other memory device now known or later developed. The terms "semiconductor device" and "memory device" are used interchangeably herein. Memory device 12 preferably comprises a plurality of memory blocks 16, each memory block 16 capable of storing a fixed amount of data. Memory block 16 may comprise a plurality of memory elements.

FIG. 2A is an exemplary flowchart of a method 20 for uniquely identifying semiconductor device 12 in accordance with an embodiment of the present invention. Method 20 may be used by the manufacturer of semiconductor device 12, the manufacturer of user device 10, etc.

Memory device 12 may have imperfections or defects caused, for example, during manufacturing of memory device 12. Because of these imperfections one or more blocks 16 of memory device 12 may become unsuitable for storing data. As such, memory device 12 is typically manufactured with spare blocks of memory to be used in place of and to compensate for the reduction in storage capacity of memory device 12 resulting from the defective blocks. Thus, even if one or more blocks 16 of memory device 12 may be unusable, memory device 12 may still perform according to its specifications. A determination 22 is made as to whether memory device 12 has imperfections. This determination may be made by using test equipment. In order to make this determination, the test equipment repeatedly writes data to and reads data from the memory elements of memory device 12 to test the ability of memory device 12 to properly store and return data. The testing is preferably performed with varying parameters to ensure proper operation across a range of operating specifications. If memory device 12 does not have any imperfections, then the process ends.

However, if it is determined that memory device 12 has defects, then a determination 24 is made as to which blocks of memory device 12 are defective. This determination may be made by determining the memory elements of memory device 12 that are defective and then determining the blocks to which those memory elements belong. The physical addresses of the defective memory blocks may be determined.

It is desirable that applications running on user device 10 are not aware of the imperfections in memory device 12. A set of continuous addresses to access the memory blocks of memory device 12 is therefore desirable. However, because some of the blocks of memory device 12 may be defective, it is not possible to have a set of continuous physical addresses that may be used to address the blocks of memory device 12. Therefore, in order to provide a set of continuous addresses which may be used to reference memory blocks 16, logical addresses are used. Logical addresses point to those physical blocks in memory device 12 which are not defective.

In order for memory device 12 to perform according to its specifications, it is desirable that memory device 12 comprise enough number of spare blocks so that the logical addresses may be mapped around the defective blocks to the non-defective blocks. As such, a determination 26 is made as to whether there are enough spare blocks available in memory device 12. If the desired number of spare blocks are not available, then the process terminates because memory device 12 will not conform to specifications and may be scrapped. Otherwise, the process starting at block 28 is executed.

A mapping table 11 (FIG. 1) is created 28 for memory device 12. Any method, now known or later developed, for creating the mapping table may be used. The mapping table comprises a plurality of logical addresses and a plurality of physical addresses, and specifies the mapping between the plurality of logical addresses and the plurality of physical addresses. Preferably, at least one mapping table that maps the logical addresses around the defective blocks, for example by mapping the logical addresses to the physical address of the non-defective blocks in memory device 12, is created. This results in at least some of the logical addresses which would otherwise have been mapped to the defective blocks being mapped to the spare blocks. An entry in the mapping table provides the proper translation from a logical address or a range of logical addresses to a physical address or a range of physical addresses for non-defective blocks. The mapping table may be used to convert a logical address to the corresponding physical address and to convert a physical address to the corresponding logical address.

Because there are a large number of blocks in memory device 12 and the number and physical addresses of the defective blocks varies from device to device, the mapping table is unique to the memory device for which it is created. The mapping table therefore provides a profile of the memory device which is unique to the memory device. An exemplary mapping table for an exemplary memory device is shown in Table I.

TABLE I

| LOGICAL ADDRESS | PHYSICAL ADDRESS |
| --- | --- |
| 0 | 0 |
| 9 | 22 |
| 1003 | 5685 |
| 10001 | 25683 |

In the example of Table I, logical addresses 0 through 8 are mapped to physical addresses 0 through 8, respectively. However, in the exemplary memory device, blocks with physical addresses 9 through 21 are defective. Therefore, logical addresses 9 through 1002 are mapped to physical addresses 22 through 1015 respectively. In the exemplary memory device, blocks with physical addresses 1016 through 5684 are defective. Therefore, logical addresses 1003 through 10000 are mapped to physical addresses 5685 through 14682. In the exemplary memory device, blocks with physical addresses 14683 through 25682 are defective. Therefore, logical addresses 10001 onwards are mapped to physical addresses 25683 onwards. It should be noted that Table I provides a simplified example of a mapping table in order to illustrate the operations of the present invention.

An identifier 13 for memory device 12 (FIG. 1) is determined 30 based at least in part on the mapping table. Identifier 13 is preferably unique to memory device 12. A flowchart of an exemplary method 30 for determining an identifier for memory device 12 in accordance with an embodiment of the present invention is provided in FIG. 3 and described below. The unique identifier is assigned 32 to memory device 12. The resulting identifier may be stored in memory device 12 itself. If desired, the resulting identifier may be stored in an external microprocessor, for example a microprocessor (not shown) associated with user device 10. It should be noted that blocks 22–28 are typically done during semiconductor memory device fabrication or device testing. Therefore, a mapping table is typically available for use by the embodiments of the present invention.

FIG. 2B is a flowchart of an exemplary method 15 for uniquely identifying semiconductor device 12 in accordance with another embodiment of the present invention. Method 15 may be used by the manufacturer of semiconductor device 12, the manufacturer of user device 10, etc.

In block 17, a memory profile of memory device 12 is accessed. In an exemplary embodiment, mapping table 11 provides the memory profile of memory device 12. In block 19, identifier 13 for memory device 12 (FIG. 1) is determined based at least in part on the memory profile. Identifier 13 is preferably unique to memory device 12. A flowchart of an exemplary method for determining an identifier for memory device 12 in accordance with an embodiment of the present invention is provided in FIG. 3 and described herein. The unique identifier is assigned 21 to memory device 12.

FIG. 3 is a flowchart of an exemplary method 30 for determining an identifier for memory device 12 in accordance with an embodiment of the present invention. In block 42, the number of non-defective blocks desired in memory device 12 is calculated. The desired number of non-defective blocks may be calculated by dividing the desired capacity of memory device 12 by the size of each block. For example, if the desired capacity of a DRAM is 64 MB and the size of each block in the DRAM is 512 bytes, then the number of desired non-defective blocks in the DRAM is (64 MB/512B=) 131,072. In block 44, the desired size, such as the number of bits, of the identifier (ID) for memory device 12 is determined. The size of the identifier may be set by the manufacturer of memory device 12 or by the manufacturer of user device 10. In block 46, the value of an offset is calculated. The value of the offset may be calculated for example by using the following formula:

$$\text{offset} = 2^{(\text{Size of identifier} - \text{Size of address used to reference each memory block})}.$$

For example, if the desired size of the identifier is 32 bits and the bit size (Y) of the address used to reference each block in memory device 12 is 17, then the value of the offset is $(2^{32-17}=)$ 32,768. If desired, the bit size of the address used to reference each memory block may be calculated, for example, by using the following formula:

$$2^Y = \text{Number of desired non-defective blocks}.$$

For example, if the desired number of non-defective blocks is 131,072, then the value of Y is 17.

In block 48, the identifier (ID) for memory device 12 is initialized, preferably to zero. In block 50, a counter I is initialized, preferably to zero. In block 52, the value of the identifier is updated. Preferably, the value of the identifier is updated based at least in part on an entry in the mapping table. For example, the value of the identifier may be updated by using the following formula:

$$ID = ID + (\text{logical address of entry I in the mapping table} * \text{offset}) + \text{physical address of entry I in the mapping table}$$

In block 54, a determination is made as to whether there are any more entries in the mapping table. If there are additional entries in the mapping table, in block 56, the counter I is incremented and the process starting at block 52 may be executed to update the value of the identifier. Otherwise, block 32 of FIG. 2A is executed to assign the identifier to memory device 12.

Method 30 of FIG. 3 for calculating a memory device identifier is only an exemplary method for calculating the memory device identifier. Any method may be used for this purpose so long as information relating to the imperfect memory profile of the memory device is used. The particular method suitable for any given memory device may depend on one or more of the following factors: the desired size of the identifier, the expected percentage of defective blocks and/or the like.

The present invention may be implemented in software, hardware, or a combination of both software and hardware. The software and/or hardware may be associated with or stored in the equipment used to manufacture memory device 12 or with user device 10 or in memory device 12 itself. If desired, the different blocks discussed herein may be executed in any order and/or concurrently with each other. Furthermore, if desired, one or more of the above described blocks may be optional or may be combined without departing from the scope of the present invention. A technical advantage of an exemplary embodiment of the present invention is that unique identifiers may be generated for different memory devices.

The invention claimed is:

1. A semiconductor device, comprising:
   a plurality of memory blocks for storing data; and
   a memory device identifier assigned to the semiconductor device, the memory device identifier determined based at least in part on a mapping table comprising information relating to mapping of a plurality of logical addresses of the plurality of memory blocks to selected ones of the plurality of memory blocks.

2. The semiconductor device of claim 1, wherein the mapping table comprises at least one entry, wherein each of the at least one entry maps a logical address of the plurality of logical addresses to a physical address of a memory block of the selected ones of the plurality of memory blocks.

3. The semiconductor device of claim 2, wherein each of the selected ones of the memory blocks is non-defective.

4. The semiconductor device of claim 1, wherein the mapping table is stored in the semiconductor device.

5. A semiconductor device, comprising:
   a plurality of memory blocks for storing data; and
   a memory device identifier assigned to the semiconductor device, the memory device identifier based at least in part on a memory profile of the semiconductor device, the memory profile based at least in part on an identification of defective memory blocks of the plurality of memory blocks.

6. The semiconductor device of claim 5, wherein the memory profile comprises a mapping table mapping a plurality of logical addresses of the plurality of memory blocks to selected ones of the plurality of memory blocks.

7. The semiconductor device of claim 6, wherein the selected ones of the plurality of memory blocks are non-defective memory blocks.

8. The semiconductor device of claim 6, wherein the mapping table is stored in the semiconductor device.

9. The semiconductor device of claim 5, wherein a size of the memory device identifier is based at least in part on a quantity of the plurality of memory blocks that are non-defective.

* * * * *